US011415995B2

(12) United States Patent
Ozawa et al.

(10) Patent No.: US 11,415,995 B2
(45) Date of Patent: *Aug. 16, 2022

(54) CONTROL DEVICE FOR VEHICLE AND CONTROL METHOD OF VEHICLE

(71) Applicant: TOYOTA JIDOSHA KABUSHIKI KAISHA, Toyota (JP)

(72) Inventors: Jun Ozawa, Machida (JP); Minami Sato, Ebina (JP); Shinichi Nagata, Ebina (JP); Hiroshi Izumi, Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 139 days.

This patent is subject to a terminal disclaimer.

(21) Appl. No.: 16/844,654

(22) Filed: Apr. 9, 2020

(65) Prior Publication Data

US 2020/0241539 A1 Jul. 30, 2020

Related U.S. Application Data

(63) Continuation of application No. 16/037,545, filed on Jul. 17, 2018, now Pat. No. 10,656,651.

(30) Foreign Application Priority Data

Aug. 31, 2017 (JP) .............................. JP2017-167011

(51) Int. Cl.
*G05D 1/02* (2020.01)
*G05D 1/00* (2006.01)
(Continued)

(52) U.S. Cl.
CPC ............. *G05D 1/0214* (2013.01); *B60Q 9/00* (2013.01); *B60Q 9/008* (2013.01); *B60W 30/00* (2013.01);
(Continued)

(58) Field of Classification Search
CPC .......... G08G 1/165; G08G 1/16; B62D 6/001; B62D 6/02; G06K 9/00805
(Continued)

(56) References Cited

U.S. PATENT DOCUMENTS 5,332,057 A 7/1994 Butsuen et al.
5,854,987 A 12/1998 Sekine et al.
(Continued)

FOREIGN PATENT DOCUMENTS

DE 102006044179 A1 9/2007
DE 102014214090 A1 3/2015
(Continued)

OTHER PUBLICATIONS

U.S. Patent Application Publication No. 2019/0064829A1 published Feb. 28, 2019.

*Primary Examiner* — Jeff A Burke
*Assistant Examiner* — Jerrod Irvin Davis
(74) *Attorney, Agent, or Firm* — Sughrue Mion, PLLC

(57) ABSTRACT

A control device includes an electronic control unit executes steering control for avoiding a collision with an object that has a possibility of colliding with a host vehicle. The electronic control unit sets a timing when the host vehicle is predicted to pass the object as an end timing of the steering control when the steering control is performed. The electronic control unit determines whether or not a deviation possibility is present when the electronic control unit assumes that the steering control ends at the end timing. The deviation possibility is a possibility of the host vehicle deviating from a current traveling lane accompanying an end of the steering control. The electronic control unit performs reduction processing that reduces the deviation possibility when the electronic control unit determines that the deviation possibility is present.

6 Claims, 9 Drawing Sheets

(51) Int. Cl.
    *B60Q 9/00*            (2006.01)
    *B62D 6/00*            (2006.01)
    *B60W 30/00*          (2006.01)
    *B62D 15/02*          (2006.01)

(52) U.S. Cl.
    CPC ........... *B62D 6/001* (2013.01); *B62D 15/025* (2013.01); *B62D 15/0265* (2013.01); *G05D 1/0088* (2013.01); *G05D 2201/0212* (2013.01)

(58) Field of Classification Search
    USPC ........................................................ 701/301
    See application file for complete search history.

(56) References Cited

U.S. PATENT DOCUMENTS

| | | | |
|---|---|---|---|
| 9,229,453 | B1 | 1/2016 | Lee |
| 9,278,646 | B2 * | 3/2016 | Mochizuki ......... G06K 9/00798 |
| 9,381,916 | B1 | 7/2016 | Zhu et al. |
| 2005/0125121 | A1 | 6/2005 | Isaji et al. |
| 2007/0288133 | A1 | 12/2007 | Nishira et al. |
| 2009/0182505 | A1 | 7/2009 | Ikeda |
| 2010/0082251 | A1 | 4/2010 | Kogure |
| 2011/0144859 | A1 | 6/2011 | Suk et al. |
| 2011/0276227 | A1 | 11/2011 | Sugawara et al. |
| 2013/0166150 | A1 | 6/2013 | Han et al. |
| 2015/0210279 | A1 | 7/2015 | Agnew et al. |
| 2015/0210311 | A1 | 7/2015 | Maurer et al. |
| 2015/0291216 | A1 * | 10/2015 | Sato ................... B62D 15/0265 701/23 |
| 2016/0042645 | A1 | 2/2016 | Harada et al. |
| 2016/0280134 | A1 * | 9/2016 | Miura ................... B60Q 9/008 |
| 2017/0313297 | A1 * | 11/2017 | Okada ................... B60W 40/04 |
| 2018/0088572 | A1 | 3/2018 | Uchida et al. |
| 2018/0319402 | A1 * | 11/2018 | Mills ..................... B60W 30/10 |
| 2018/0373250 | A1 | 12/2018 | Nakamura et al. |
| 2019/0071098 | A1 * | 3/2019 | Asakura ............. G06K 9/00798 |

FOREIGN PATENT DOCUMENTS

| | | |
|---|---|---|
| JP | 2006-151114 A | 6/2006 |
| JP | 2006-260217 A | 9/2006 |
| JP | 2008-132867 A | 6/2008 |
| JP | 2008-195289 A | 8/2008 |
| JP | 2008-307951 A | 12/2008 |
| JP | 2010-083312 A | 4/2010 |
| JP | 2010-089701 A | 4/2010 |
| JP | 2013-100064 A | 5/2013 |
| JP | 2013-133096 A | 7/2013 |
| JP | 2013-173416 A | 9/2013 |
| JP | 2013-186722 A | 9/2013 |
| JP | 2015-155295 A | 8/2015 |
| JP | 2015209129 A * | 11/2015 |

* cited by examiner

CONTROL DEVICE FOR VEHICLE AND CONTROL METHOD OF VEHICLE

INCORPORATION BY REFERENCE

This application is a continuation of U.S. application Ser. No. 16/037,545 filed Jul. 17, 2018 (allowed), which claims priority from Japanese Patent Application No. 2017-167011 filed Aug. 31, 2017. The entire disclosures of the prior applications are considered part of the disclosure of the accompanying continuation application, and are hereby incorporated herein by reference in its entirety.

BACKGROUND

1. Technical Field

The disclosure relates to a control device for a vehicle and a control method of the vehicle.

2. Description of Related Art

Japanese Unexamined Patent Application Publication No. 2015-155295 (JP2015-155295A) discloses a vehicle control device that performs steering control when a vehicle passes a pedestrian. The vehicle control device identifies the pedestrian close to the vehicle using an on-vehicle sensor. The vehicle control device calculates a collision probability with an identified pedestrian and compares the calculated probability with a threshold value. When the collision probability with the pedestrian is higher than the threshold value, the vehicle control device sets a separation distance from the identified pedestrian within a current traveling lane. Steering control is control for adjusting a position of the vehicle in the right and left direction (vehicle width direction) when the vehicle passes the identified pedestrian based on the set separation distance. With the steering control as described above, it is possible for the vehicle to safely pass the identified pedestrian while the vehicle avoids the collision with the identified pedestrian. In the steering control, an adjustment for returning the position of the vehicle in the right and left direction to the center of the current traveling lane is also performed after the passing of the identified pedestrian ends.

SUMMARY

The steering control described above can be ended at a stage where the vehicle passes the identified pedestrian. That is, the adjustment for returning the position of the vehicle in the right and left direction to the center of the current traveling lane can be omitted. With the steering control as described above, it is possible to minimize an intervention of a driver in a driving operation and to further reduce a sense of discomfort felt by the driver during the intervention.

However, when the steering control ends at the stage where the vehicle passes the identified pedestrian, steering torque generated in the vehicle at the passing stage, a steering angle of the vehicle at the passing stage, and the like may cause a problem. That is, when the steering torque is generated in the vehicle at the passing stage, the steering torque is needed to be maintained by the driver after the steering control ends. The steering angle of the vehicle at the passing stage is also the same, and the steering angle is needed to be maintained by the driver after the steering control ends. However, when the driver does not grasp the need to maintain the steering angle, there is a possibility that the vehicle advances in a direction not intended by the driver and deviates from (depart from) the current traveling lane after the steering control ends.

The disclosure provides a control device for a vehicle and a control method of the vehicle capable of suppressing the deviation of a vehicle from a current traveling lane accompanying the end of steering control after the vehicle passes an obstacle in the control device and the control method that performs the steering control when the vehicle passes the obstacle that has a possibility of colliding with the vehicle.

A first aspect of the disclosure relates to a control device for a vehicle. The control device includes an electronic control unit that is configured to execute steering control for avoiding a collision of a host vehicle with an object that has a possibility of colliding with the host vehicle (hereinafter, referred to as "object"). The electronic control unit is configured to set a timing when the host vehicle is predicted to pass the object as an end timing of the steering control when the steering control is performed. The electronic control unit is configured to determine whether or not a deviation possibility is present when the electronic control unit assumes that the steering control ends at the end timing. The deviation possibility is a possibility of the host vehicle deviating from a current traveling lane accompanying an end of the steering control. The electronic control unit is configured to perform reduction processing that reduces the deviation possibility when the electronic control unit determines that the deviation possibility is present.

According to the above mentioned configuration, in a case where the timing when the host vehicle is predicted to pass the object is set as the end timing of the steering control, the reduction processing is performed when the deviation possibility is determined to be present. Accordingly, the deviation from the current traveling lane accompanying the end of the steering control after passing of the object can be suppressed.

In the control device according to the first aspect of the disclosure, the reduction processing may include processing of postponing the end timing, processing of setting a control amount of steered wheels of the host vehicle during postponement of the end timing, and processing of setting a control amount for causing the host vehicle to travel along a trajectory that maintains a distance from a boundary line on a deviation side of the current traveling lane to the host vehicle to be equal to or larger than a predetermined distance.

According to the above mentioned configuration, the reduction processing including the processing of postponing the end timing of the steering control and the processing of setting the control amount of the steered wheels during the postponement of the end timing is performed. In the setting processing described above, the control amount for causing the host vehicle to travel along the trajectory that maintains the distance from the boundary line on the deviation side of the current traveling lane to the host vehicle to be equal to or larger than the predetermined distance is set. Accordingly, the deviation of the host vehicle from the current traveling lane can be suppressed with a high probability.

In the control device according to the first aspect of the disclosure, the electronic control unit may be configured to notify a driver of end notice of the steering control through an interface of the host vehicle during a period from a timing before the end timing by a predetermined time to the end timing. The reduction processing may include processing of notifying the driver of the end notice during a period from the timing before the predetermined time to a timing after the postponement of the end timing.

According to the above mentioned configuration, the reduction processing that notifies the driver of the end notice of the steering control during the period from an initial notification timing to the end timing after the postponement of the steering control is performed. Accordingly, a period for preparing the driver for the end of the steering control can be ensured, and delivery of steering initiative from the control device to the driver can be safely performed.

In the control device according to the first aspect of the disclosure, the electronic control unit may be configured to notify a driver of end notice of the steering control through an interface of the host vehicle during a period from a timing before the end timing by a predetermined time to the end timing. The reduction processing may include processing of notifying the driver of the end notice during a period from a timing further earlier than the timing before the predetermined time to the end timing.

According to the above mentioned configuration, the reduction processing that notifies the driver of the end notice of the steering control during the period from a timing further earlier than the initial notification timing to the end timing of the steering control is performed. Accordingly, the period for preparing the driver for the end of the steering control can be ensured, and the delivery of the steering initiative from the control device to the driver can be safely performed.

A second aspect of the disclosure relates to a control method of a vehicle. The vehicle includes an electronic control unit. The control method includes: executing, by the electronic control unit, steering control for avoiding a collision of a host vehicle with an object that has a possibility of colliding with the host vehicle; setting, by the electronic control unit, a timing when the host vehicle is predicted to be pass the object as an end timing of the steering control when the steering control is performed; determining, by the electronic control unit, whether or not a deviation possibility is present when the electronic control unit assumes that the steering control is ended at the end timing; and performing, by the electronic control unit, reduction processing that reduces the deviation possibility when the electronic control unit determines that the deviation possibility is present. The deviation possibility is a possibility of the host vehicle deviating from a current traveling lane accompanying an end of the steering control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
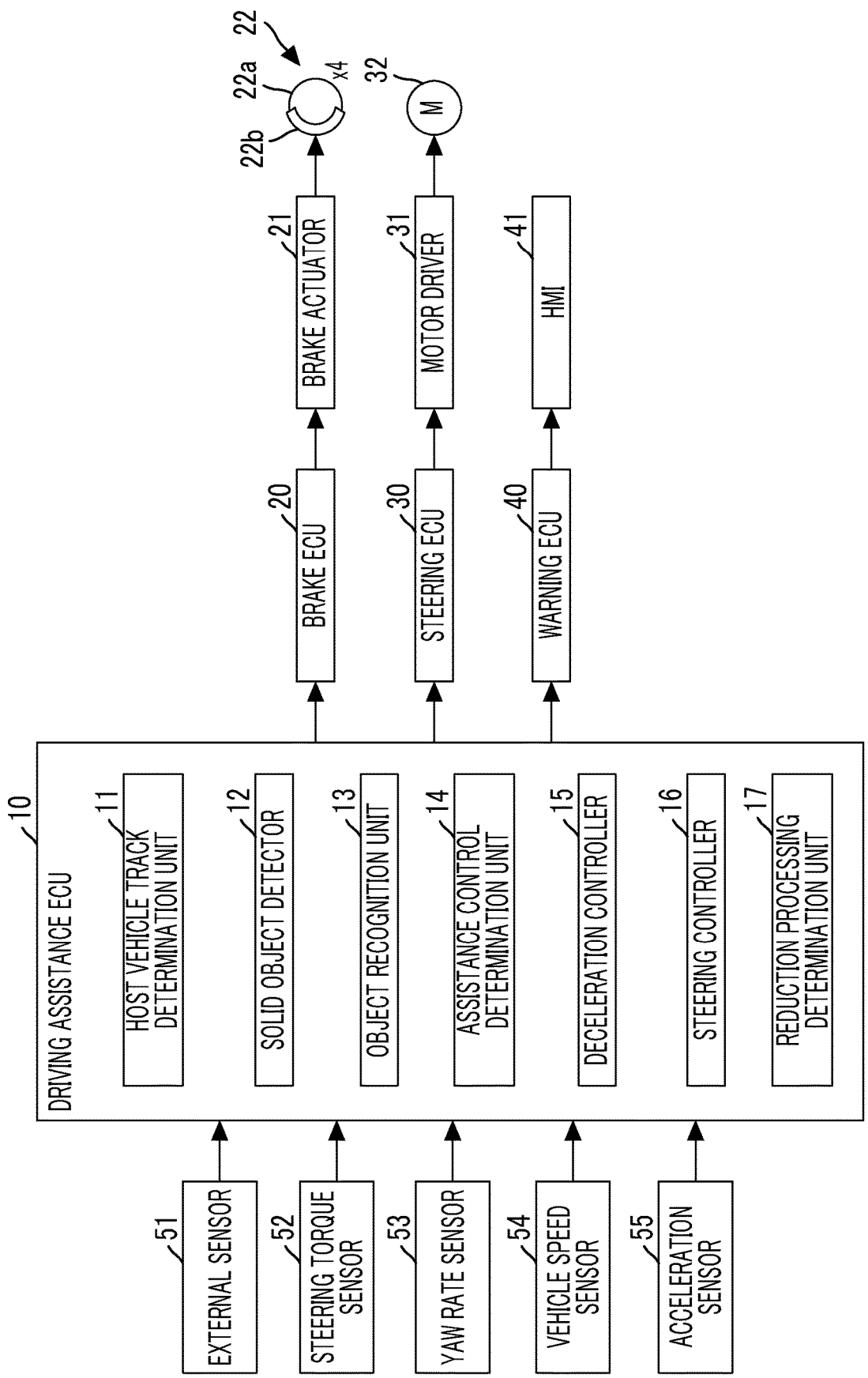
FIG. 1 is a block diagram for describing a configuration of a control device according to Embodiment 1.

Hereinafter, embodiments of the disclosure will be described based on drawings. The same reference numeral is assigned to a common element in each drawing, and redundant description is omitted. The disclosure is not limited to the following embodiments.

First, Embodiment 1 will be described with reference to FIGS. 1 to 10.

Configuration of Control Device for Vehicle

FIG. 1 is a block diagram for describing a configuration of a control device for vehicle according to Embodiment 1. The control device according to Embodiment 1 includes a driving assistance ECU 10, a brake ECU 20, a steering ECU 30, and a warning ECU 40. Each ECU includes a microcomputer as a main part and is connected so as to be transmittable and receivable mutually through a controller area network (CAN) (not illustrated). The ECU stands for an electronic control unit. In the specification, the microcomputer includes a central processing unit (CPU) and a storage device such as a read only memory (ROM) and a random access memory (RAM), and the CPU executes an instruction (program) stored in the ROM to realize various functions. In the specification, a vehicle on which the control device is mounted is also referred to as "host vehicle".

The driving assistance ECU 10 is connected to an external sensor 51, a steering torque sensor 52, a yaw rate sensor 53, a vehicle speed sensor 54, and an acceleration sensor 55. The steering torque sensor 52, the yaw rate sensor 53, the vehicle speed sensor 54, and the acceleration sensor 55 are classified as internal sensors.

The external sensor 51 has a function of acquiring information relating to at least a road in front of the host vehicle and a solid object present around the road. The solid object represents, for example, a moving object such as a pedestrian, a bicycle, and a vehicle, and a fixed object such as a utility pole, a tree, and a guardrail.

The external sensor 51 includes, for example, a radar sensor and a camera sensor. The radar sensor radiates, for example, a radio wave in a millimeter wave band (hereinafter, referred to as "millimeter wave") to the surroundings (including at least the front side) of the host vehicle. When a solid object reflecting the millimeter wave is present in a radiation range, the radar sensor calculates presence or absence of the solid object and a relative relationship (distance between the host vehicle and the solid object, relative speed of the host vehicle with respect to the solid object, and the like) between the host vehicle and the solid object by the reflected wave from the solid object. The camera sensor includes, for example, a stereo camera. The camera sensor images right and left scenes in front of the vehicle and calculates the shape of a road, the presence or absence of the solid object, the relative relationship between the host vehicle and the solid object, and the like based on the imaged right and left image data. The camera sensor recognizes a lane marker (hereinafter, referred to as "white line") such as an outside line of a roadway, a center line of the roadway, and a boundary line between a traveling lane and a passing lane to calculate the shape of the road and a positional relationship between the road and the host vehicle.

Information acquired by the external sensor 51 is also referred to as "target information". The external sensor 51 repeatedly transmits the target information to the driving assistance ECU 10 at a predetermined period. The external sensor 51 may not include the radar sensor and the camera sensor and may include, for example, only the camera sensor. Information of a navigation system can be used for information on the shape of the road on which the host vehicle travels and information representing the positional relationship between the road and the host vehicle.

The steering torque sensor 52 detects steering torque that a driver inputs to steered wheels and transmits a detection signal of the steering torque to the driving assistance ECU 10. The yaw rate sensor 53 detects a yaw rate applied to the host vehicle and transmits a detection signal of the yaw rate to the driving assistance ECU 10. The vehicle speed sensor 54 detects a traveling speed of the host vehicle (hereinafter, referred to as "vehicle speed") and transmits a detection signal of the traveling speed to the driving assistance ECU 10. The acceleration sensor 55 detects front-rear acceleration which is acceleration applied in the front-rear direction of the host vehicle and lateral acceleration which is acceleration applied in the right and left direction (vehicle width direction) of the host vehicle, and transmits a detection signal of the front-rear acceleration and the lateral acceleration to the driving assistance ECU 10. The vehicle speed sensor 54 may be a tire-wheel assembly speed sensor.

The brake ECU 20 is connected to a brake actuator 21. The brake actuator 21 is provided in a hydraulic circuit between a master cylinder (not illustrated) that pressurizes hydraulic oil by stepping force on a brake pedal and friction brake mechanisms 22 provided on right, left, front, and rear tire-wheel assemblies. The friction brake mechanism 22 includes a brake disc 22a fixed to the tire-wheel assembly and a brake caliper 22b fixed to a vehicle body. The friction brake mechanism 22 operates a wheel cylinder embedded in the brake caliper 22b by hydraulic pressure of the hydraulic oil supplied from the brake actuator 21 to press a brake pad against the brake disc 22a and generates friction braking force.

The steering ECU 30 is a control device of an electric power steering system and is connected to a motor driver 31. The motor driver 31 is connected to a steering motor 32. The steering motor 32 is incorporated in a steering mechanism (not illustrated), a rotor of the motor is rotated by electric power supplied from the motor driver 31, and right and left steering tire-wheel assemblies are steered by the rotation of the rotor. In a normal time, the steering ECU 30 causes the steering motor 32 to generate steering assist torque corresponding to steering torque of the driver detected by the steering torque sensor 52. A direction of the steering torque is identified by a sign (positive or negative) of the steering torque. For example, the steering torque acting in the right direction is represented as positive steering torque, and the steering torque acting in the left direction is represented as negative steering torque. When a steering control command value (steering torque command value described below) transmitted from the driving assistance ECU 10 is received when the driver does not operate a steering wheel, the steering motor 32 is driven and controlled according to the steering control command value to steer the steering tire-wheel assemblies.

The warning ECU 40 is connected to a human machine interface (HMI) 41. The HMI 41 is sound output means such as a buzzer and a speaker, and display means such as a head up display (HUD), a display of the navigation system, and combination meter. The warning ECU 40 outputs a warning sound from the sound output means according to an alert command from the driving assistance ECU 10 or displays a warning message, a warning lamp, and the like on the display means to notify the driver of an operation situation of assistance control.

Configuration of Driving Assistance ECU

The driving assistance ECU 10 will be described. The driving assistance ECU 10 includes a host vehicle track determination unit 11, a solid object detector 12, an object recognition unit (hereinafter, referred to as object recognition unit) 13 that determines an object with a possibility of a collision, an assistance control determination unit 14, a deceleration controller 15, a steering controller 16, a reduction processing determination unit (hereinafter, referred to as reduction processing determination unit) 17 that determines presence or absence of a possibility of deviating from the traveling lane.

The host vehicle track determination unit 11 generates information relating to the road on which the host vehicle travels at a predetermined calculation cycle based on the target information transmitted from the external sensor 51. With a front end center position of the host vehicle as an origin point, the host vehicle track determination unit 11 generates, for example, coordinate information (position information) on the ground, the solid object, and the white line using a coordinate system expanding in the right and left direction, and the front side from the origin point. As described above, the host vehicle track determination unit 11 grasps a shape of the traveling lane of the host vehicle defined by right and left white lines, a position and an orientation of the host vehicle within the traveling lane, and a relative position of the solid object with respect to the host vehicle. The host vehicle track determination unit 11 calculates a turning radius of the host vehicle based on the yaw rate detected by the yaw rate sensor 53 and the vehicle speed detected by the vehicle speed sensor 54, and calculates a trajectory of the host vehicle based on the turning radius.

The solid object detector 12 discriminates whether the solid object is the moving object or a stationary object based on a change in a position of the solid object. When the solid object is discriminated as the moving object, the solid object detector 12 calculates a trajectory of the solid object. For example, a movement speed of the solid object in the front-rear direction (traveling direction of the host vehicle) can be calculated from a relationship between the vehicle speed and the relative speed with respect to the solid object. A movement speed of the solid object in the right and left direction can be calculated from a change amount of a distance between a lateral end position of the solid object and the white line detected by the external sensor 51 and the like. The solid object detector 12 calculates the trajectory of the solid object based on the movement speeds of the solid object in the front-rear direction, and the right and left direction. The solid object detector 12 may calculate the trajectory of the solid object based on the calculated trajectory of the host vehicle and the distance between the host vehicle and the solid object detected by the external sensor 51.

The object recognition unit 13 performs determination relating to the possibility (hereinafter, referred to as "collision possibility") of the collision of the host vehicle with the solid object of when the host vehicle travels with maintaining a current traveling state based on the position of the solid object and the trajectory of the host vehicle. When the solid object is the moving object, the object recognition unit 13 calculates the trajectory of the solid object and performs the determination relating to the collision possibility based on the trajectory of the solid object and the trajectory of the host vehicle. The object recognition unit 13 calculates a time to collision TTC which is a prediction time before the host vehicle collides with the solid object (remaining time before collision) by the following equation (1) based on a distance $L_1$ between the solid object and the host vehicle and a relative speed $Vr_1$ with the solid object.

$$TTC = L_1/Vr_1 \qquad (1)$$

When the time to collision TTC is equal to or less than a collision determination value $TTC_1$ set in advance, the object recognition unit 13 determines that the collision possibility is high. When the time to collision TTC is longer than a collision determination value $TTC_2$ ($>TTC_1$) set in advance, the object recognition unit 13 determines that there is no collision possibility. When the time to collision TTC is between the collision determination value $TTC_1$ and the collision determination value $TTC_2$, the object recognition unit 13 determines that the collision possibility is low. When the collision possibility is determined to be high and the collision possibility is determined to be low, the object recognition unit 13 recognizes the solid object as the object. That is, when the time to collision TTC is equal to or less than the collision determination value $TTC_2$, the object recognition unit 13 recognizes the solid object as the object.

The assistance control determination unit 14 determines the presence or absence of the recognition of the object by the object recognition unit 13. When the object is recognized, the assistance control determination unit 14 selects the assistance control for avoiding the collision with the object and sets a start timing and an end timing of the selected assistance control. The assistance control includes deceleration control for decelerating the host vehicle by intervening in the driving operation of the driver and steering control for controlling the steering torque of the host vehicle by intervening in the driving operation of the driver.

The selection of the assistance control can be performed, for example, based on a level of the collision possibility. Specifically, when the collision possibility is high, the assistance control determination unit 14 selects the deceleration control as the assistance control. When the collision possibility is low, the assistance control determination unit 14 selects the steering control as the assistance control. The assistance control determination unit 14 can also select a combination of the deceleration control and the steering control as the assistance control regardless of the level of the collision possibility. A method of setting the start timing and the end timing of the selected assistance control will be described below.

When the start timing and the end timing of the deceleration control are set, the deceleration controller 15 calculates a target deceleration for decelerating the host vehicle. For example, a case where the object is stopped is taken as an example. When a vehicle speed (=relative speed) at a current timing is V, a deceleration of the host vehicle is a, and a time until the host vehicle stops is t, a traveling distance X until the host vehicle stops can be represented by the following equation (2).

$$X = V \cdot t + (\tfrac{1}{2}) \cdot a \cdot t^2 \qquad (2)$$

The time t until the host vehicle stops can be represented by the following equation (3).

$$t = -V/a \qquad (3)$$

Accordingly, the deceleration a which is needed to stop the host vehicle at a traveling distance TD can be represented by the following equation (4) by substituting equation (3) into equation (2).

$$a = -V^2/2TD \qquad (4)$$

In order to stop the host vehicle at a distance β before the object, the traveling distance TD may be set to a distance ($L_1$-β) which is obtained by subtracting the distance β from the distance $L_1$ detected by the external sensor 51. When the object is moved, the deceleration a may be calculated using the relative speed with respect to the object.

The deceleration controller 15 sets calculated deceleration, as described above, to the target deceleration. However, the deceleration that can be generated in the host vehicle has a limit (for example, about −1 G). Therefore, when an absolute value of the calculated target deceleration is larger than an absolute value of an upper limit value amax, the deceleration controller 15 sets the target deceleration to the upper limit value amax. The deceleration controller 15 transmits a braking command representing the target deceleration to the brake ECU 20. As described above, the brake ECU 20 controls the brake actuator 21 according to the target deceleration to generate the friction braking force in the tire-wheel assemblies. As described above, an automatic brake is operated and the host vehicle decelerates.

Figure 2:
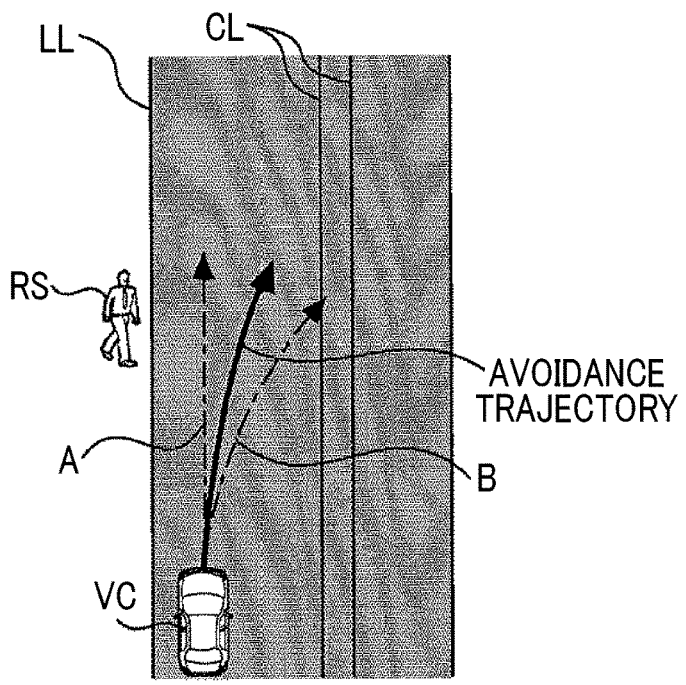
FIG. 2 is a diagram for describing a method of specifying an avoidance trajectory.

When the start timing and the end timing of the steering control are set, the steering controller 16 calculates and specifies the avoidance trajectory in which the host vehicle may take to avoid the collision with the object at a predetermined calculation cycle. FIG. 2 is a diagram for describing a method of specifying the avoidance trajectory. For example, when the host vehicle is assumed to travel within a current traveling lane with maintaining the current traveling state, the steering controller 16 specifies a route A through which the host vehicle is predicted to travel. When the host vehicle adds the maximum change in lateral acceleration for the host vehicle to turn safely within the current traveling lane to current lateral acceleration, the steering controller 16 specifies a route B through which the host vehicle is predicted to travel.

The steering controller 16 obtains a route candidate when the lateral acceleration is changed by a constant amount in a traveling range from the route A to the route B. The steering controller 16 specifies a trajectory that can safely avoid the collision with an object RS by turning of a host vehicle VC and where the lateral acceleration becomes the smallest as the avoidance trajectory based on a degree of interference between the route candidate and the object.

The steering controller 16 calculates a target yaw rate for causing the host vehicle to travel along the avoidance trajectory specified as described above. The steering controller 16 calculates target steering torque that can obtain the target yaw rate based on the target yaw rate. The steering controller 16 stores in advance a map (not illustrated) in which the target steering torque that increases as a variation between the yaw rate detected by the yaw rate sensor 53 and the target yaw rate increases is set and calculates the target steering torque with reference to the map. The calculation described above is performed at a predetermined calculation cycle.

When the target steering torque is calculated, the steering controller 16 calculates target steering assist torque obtained by subtracting a current steering torque of the driver from the target steering torque. The steering controller 16 calculates a steering torque command value that increases toward the calculated target steering assist torque and transmits the calculated steering torque command value to the steering ECU 30. However, the steering torque is restricted. Therefore, when the calculated target steering assist torque (positive target steering assist torque) is larger than an upper limit value Trmax, the steering controller 16 sets the target steering assist torque to the upper limit value Trmax. When the calculated target steering assist torque (negative target steering assist torque) is smaller than a lower limit value Trmin, the steering controller 16 sets the target steering assist torque to the lower limit value Trmin. The steering ECU 30 controls a switching element of the motor driver 31 to control energization to the steering motor 32 such that the steering motor 32 generates steering torque having the magnitude of the steering torque command value according to the steering torque command value. As described above, the steering tire-wheel assemblies are autonomously steered, and the host vehicle travels along the avoidance trajectory.

The steering controller 16 sets the target steering torque after the end timing of the steering control to zero. When the steering torque of the driver increases even before the end timing, the steering controller 16 sets the target steering torque to zero. The steering controller 16 calculates a steering torque command value that increases or decreases toward the set target steering torque (that is, zero) and transmits the calculated steering torque command value to the steering ECU 30. Energization control after the end timing of the steering control is basically the same as the energization control during a period from the start timing to the end timing of the steering control. The steering assist torque input to the steering motor 32 gradually increases or decreases by the energization control.

The assistance control determination unit 14 sets various timings relating to notice of the assistance control. The assistance control determination unit 14 transmits the alert command to the warning ECU 40 at a stage before the automatic brake is operated or before the steering tire-wheel assemblies are autonomously steered. As described above, the warning ECU 40 rings the sound output means or displays a warning message, a warning lamp, and the like on the display means to inform the driver of the operation situation of the assistance control. The warning ECU 40 starts or ends the operation of the sound output means and the like at the various timings relating to the notice of the assistance control based on the alert command. As described above, start notice is executed during a period from a timing before the start timing of the assistance control by a predetermined time to the start timing. End notice is executed during a period from a timing before the end timing of the assistance control by a predetermined time to the end timing.

When at least the steering control is selected as the assistance control, the reduction processing determination unit 17 performs determination relating to the possibility (hereinafter, referred to as "deviation possibility") that the host vehicle advances in a direction not intended by the driver and deviates from (move out of) the current traveling lane after the steering control ends. Details of the reduction processing determination unit 17 will be described below.

Details of Assistance Control Determination Unit

Figure 3:
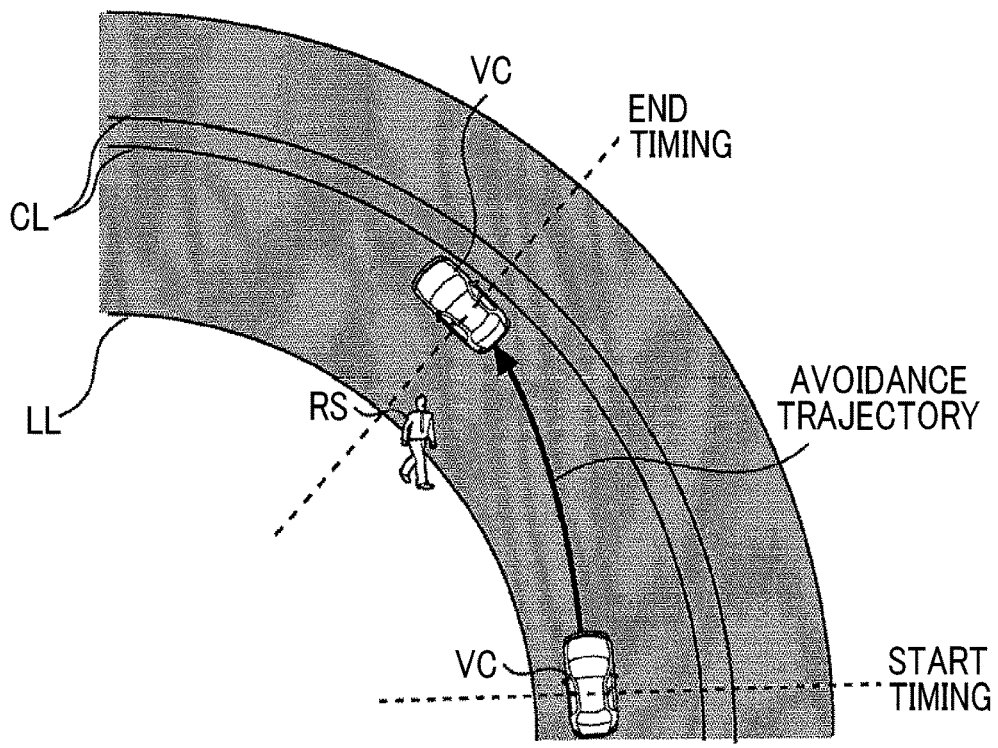
FIG. 3 is a diagram for describing an operation example of a host vehicle when steering control is selected as assistance control.

Details of the assistance control determination unit 14 will be described. As described already, when the object is recognized, the assistance control determination unit 14 selects at least one of the deceleration control or the steering control as the assistance control. FIG. 3 is a diagram for describing an operation example of the host vehicle when the steering control is selected as the assistance control. In the example illustrated in FIG. 3, the object RS is assumed to be recognized. It is assumed that the possibility of the collision of the host vehicle VC with the object RS is determined to be low. At least the steering control is assumed to be selected as the assistance control so as to cause the host vehicle VC to pass the object RS instead of stopping the host vehicle VC before the object RS.

Here, when the start timing of the steering control is too early, the autonomous steering interferes with a steering wheel operation of the driver. For example, there is a case where the autonomous steering is started ahead of the steering wheel operation despite a situation where the driver is aware of presence of the object RS and attempts to operate the steering wheel when the object RS and the host vehicle VC come close to each other. In the case described above, the driver may feel a sense of discomfort. In order to avoid the problem as described above, the assistance control determination unit 14 sets a timing when the host vehicle VC is predicted to be close to the object RS to the start timing of the steering control. When the steering control is in combination with the deceleration control, the assistance control determination unit 14 sets the start timing of the deceleration control to the same timing as the start timing of the steering control.

The assistance control determination unit 14 sets a timing when the host vehicle VC is predicted to completely pass the object RS to the end timing of the steering control. The timing when the host vehicle VC is predicted to completely pass the object RS is calculated by adding an execution period TA of the steering control to the start timing of the steering control. The execution period TA can be represented by the following equation (5) using a distance $L_2$ between the object $RS_1$ and the host vehicle VC, a longitudinal width WRS of the object RS, and a relative speed $Vr_2$ with the object RS at the start timing of the steering control.

$$TA=(L_2+WRS)/Vr_2 \tag{5}$$

When the steering control is in combination with the deceleration control, the end timing of the steering control coincides with the end timing of the deceleration control.

Details of Reduction Processing Determination Unit and Feature of Reduction Processing According to Embodiment 1

Figure 4:
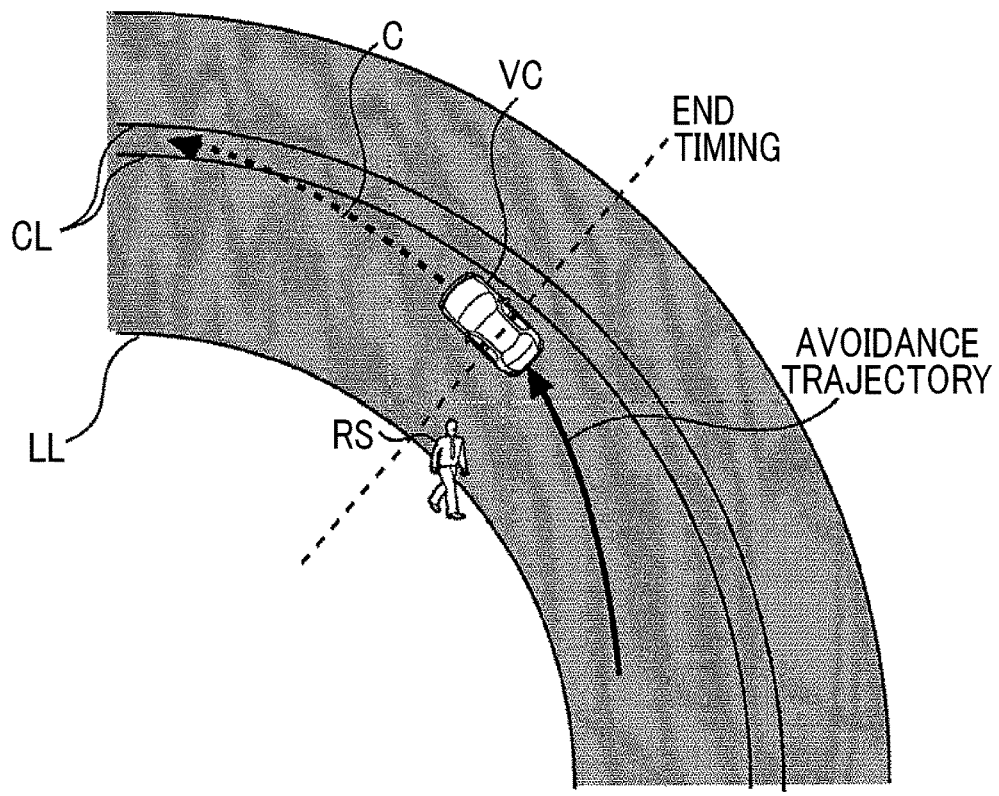
FIG. 4 is a diagram for describing a trajectory of the host vehicle after the vehicle passes an object.

FIG. 4 is a diagram for describing a trajectory of the host vehicle after the vehicle passes the object. In the example illustrated in FIG. 4, at least the steering control is assumed to be selected as the assistance control similarly to the example illustrated in FIG. 3. The host vehicle VC, the object RS, and the end timing illustrated in FIG. 4 are the same as those illustrated in FIG. 3. As described already, the steering assist torque input to the steering motor 32 gradually increases or decreases after the end timing of the steering control. However, the current traveling lane of the host vehicle VC is curved. Therefore, when the steering torque of the driver does not change before and after the end timing, the host vehicle VC travels on a route C accompanying the gradual change in the steering assist torque. For example, when the driver is aware of the end of the steering control with delay, it is expected that the steering torque of the driver does not change before and after the end timing. As described above, when the steering torque of the driver after the end timing is not sufficient, there is the possibility that the host vehicle VC deviates from the current traveling lane.

In view of the problem as described above, when at least the steering control is selected as the assistance control, the reduction processing determination unit 17 determines presence or absence of the deviation possibility after the end timing of the steering control. The deviation possibility is determined in consideration of, for example, host vehicle track information such as a curvature radius R of the traveling lane and a road surface gradient, host vehicle state information such as the steering assist torque, the lateral acceleration, and a roll angle after the end timing, and surrounding environment information in a deviation direction such as a distance from a position of the host vehicle VC after the end timing to center line CL and presence or absence of another vehicle traveling in an adjacent lane separated by the center line CL. When the reduction processing determination unit 17 determines that there is the deviation possibility, the reduction processing determination unit 17 delays the end timing of the steering control set by the assistance control determination unit 14. That is, the reduction processing determination unit 17 postpones the end timing of the steering control set by the assistance control determination unit 14.

When the steering control is in combination with the deceleration control, the reduction processing determination unit 17 postpones the end timing of the deceleration control in accordance with the postponement of the end timing of the steering control. As described above, the end timing of the deceleration control after the postponement coincides with the end timing of the steering control after the postponement. The end timing of the deceleration control may not be postponed, and the deceleration control may be ended at an initially set end timing.

When the steering control is in combination with the deceleration control, the deceleration controller 15 calculates the target deceleration (or target acceleration) for maintaining the vehicle speed at the end timing before the postponement during a period from the end timing before the postponement to an end timing after the postponement when the end timing of the deceleration control is postponed.

Figure 5:
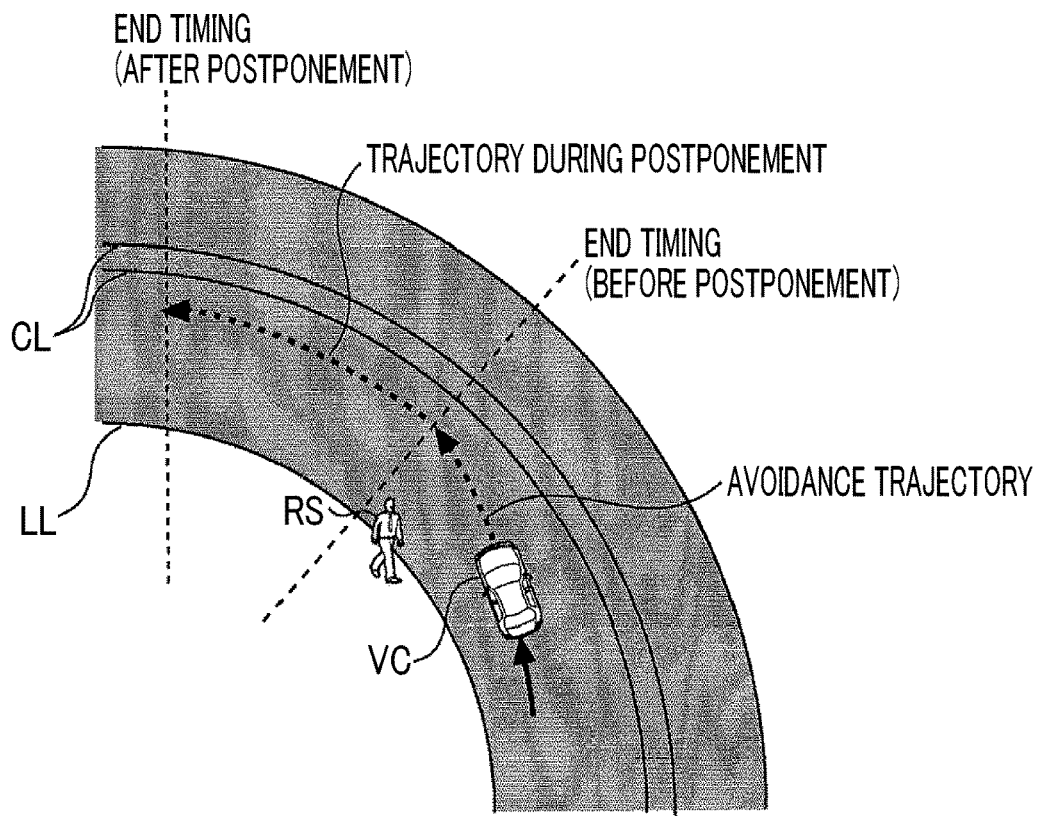
FIG. 5 is a diagram for describing an example of reduction processing according to Embodiment 1.

When the end timing of the steering control is postponed, the steering controller 16 calculates and specifies a trajectory (hereinafter, referred to as "trajectory during the postponement") for the host vehicle to travel within the current traveling lane during the period from the end timing before the postponement to the end timing after the postponement at a predetermined calculation cycle. FIG. 5 is a diagram for describing an example of reduction processing according to Embodiment 1. In the example illustrated in FIG. 5, at least the steering control is assumed to be selected as the assistance control similarly to the examples illustrated in FIGS. 3 and 4. The host vehicle VC and the object RS illustrated in FIG. 5 are the same as those illustrated in FIGS. 3 and 4. The end timing (before postponement) illustrated in FIG. 5 corresponds to the end timing illustrated in FIGS. 3 and 4.

In the example illustrated in FIG. 5, a trajectory for maintaining the distance from the position of the host vehicle VC at the end timing before the postponement of the steering control to the center line CL during the postponement of the end timing is specified as the trajectory during the postponement. The steering controller 16 calculates a target yaw rate for causing the host vehicle VC to travel along the trajectory during the postponement. The steering controller 16 calculates target steering torque that can obtain the target yaw rate based on the target yaw rate. When the target steering torque is calculated, the steering controller 16 calculates target steering assist torque obtained by subtracting a current steering torque of the driver from the target steering torque. The steering controller 16 calculates a steering torque command value that increases or decreases toward the calculated target steering assist torque and transmits the calculated steering torque command value to the steering ECU 30. The steering ECU 30 controls the energization to the steering motor according to the steering torque command value. As described above, the steering tire-wheel assemblies are autonomously steered, and the host vehicle VC travels along the trajectory during the postponement.

When the end timing of the steering control is postponed, the reduction processing determination unit 17 updates a start timing of the end notice of the steering control and transmits the alert command to the warning ECU 40. The warning ECU 40 starts ringing or the like of the sound output means as the end notice of the steering control from a timing before the end timing before the postponement of the steering control by a predetermined time based on the alert command. The warning ECU 40 ends the ringing or the like of the sound output means as the end notice thereof at an end timing after the postponement of the steering control based on the alert command.

Specific Processing in Embodiment 1

Figure 6:
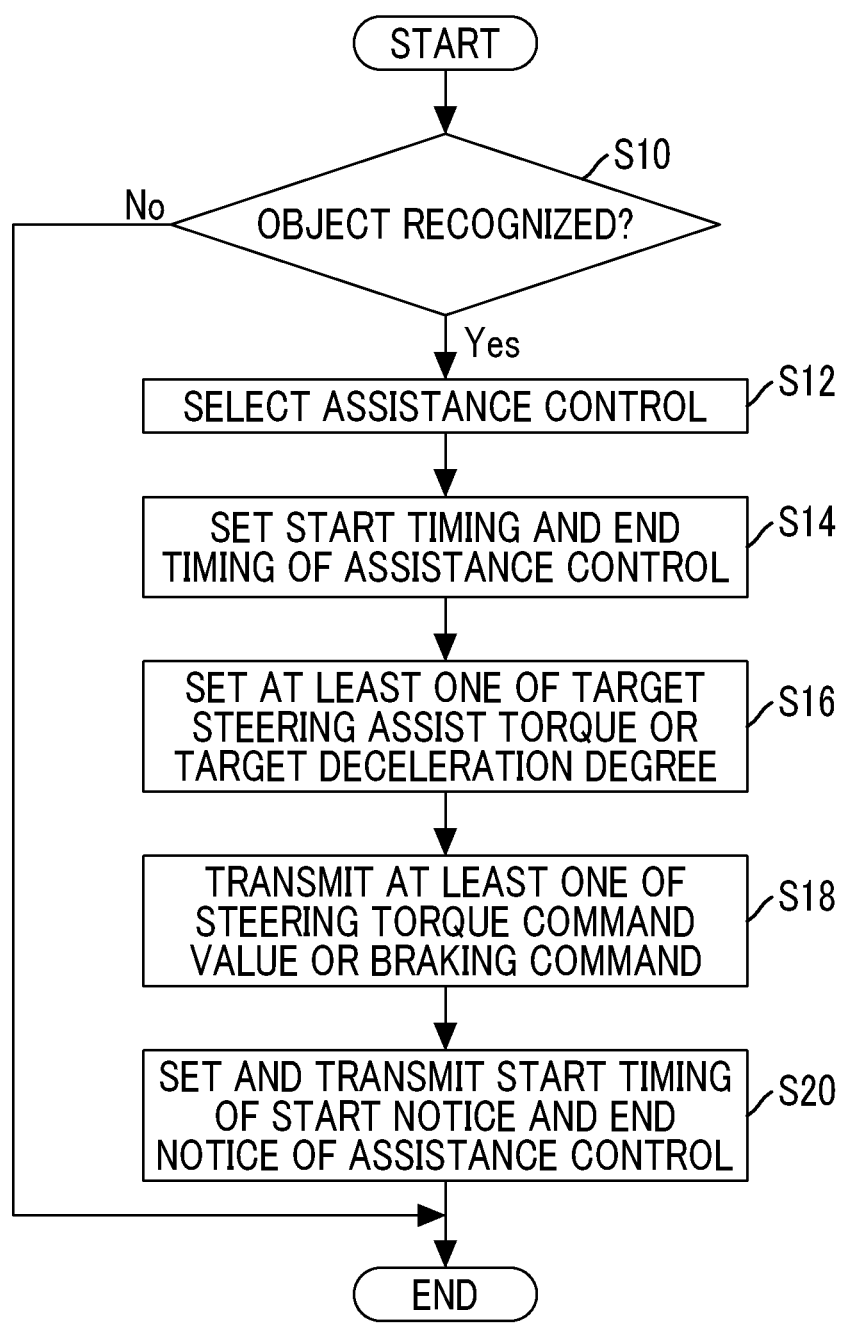
FIG. 6 is a flowchart for describing an example of an assistance control processing routine implemented by a driving assistance ECU in Embodiment 1.
Figure 7:
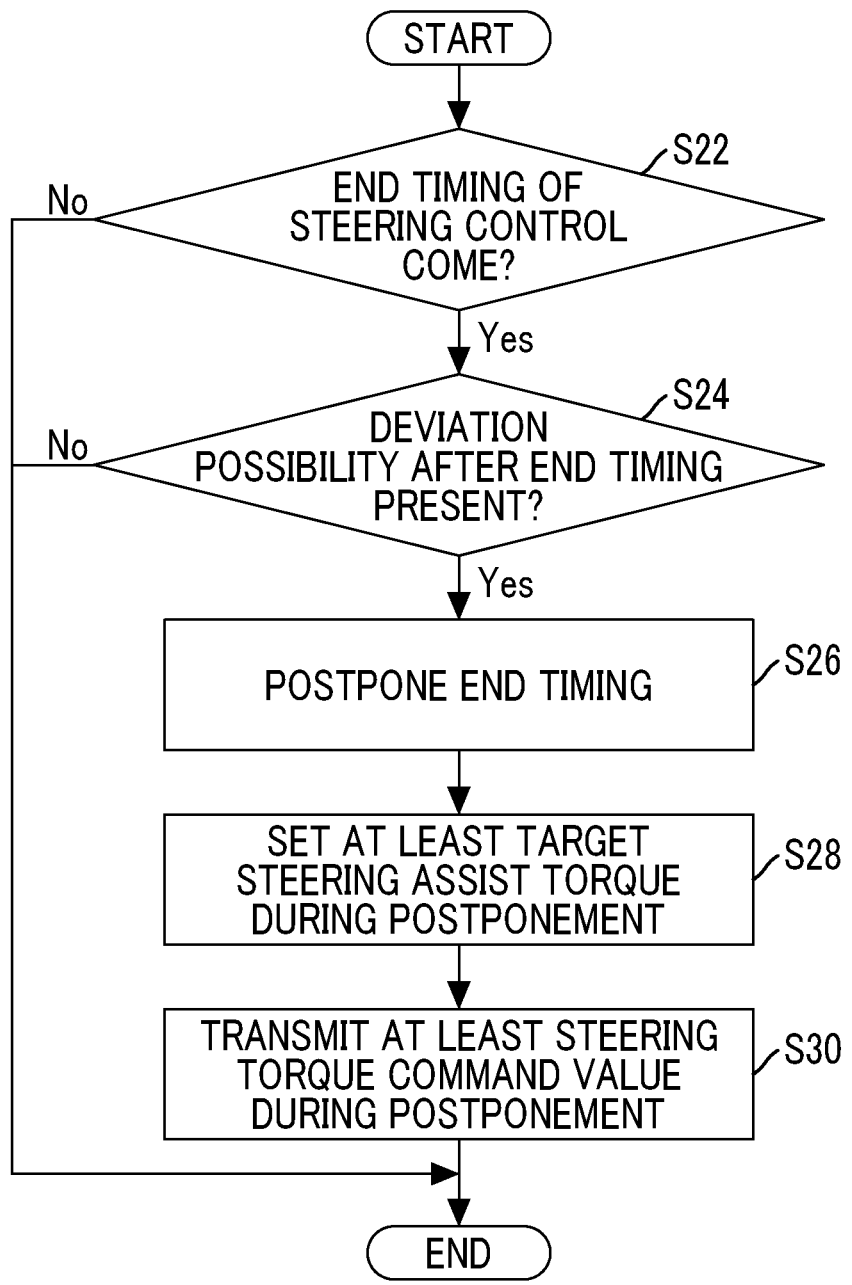
FIG. 7 is a flowchart for describing an example of a reduction processing routine implemented by the driving assistance ECU in Embodiment 1.
Figure 8:
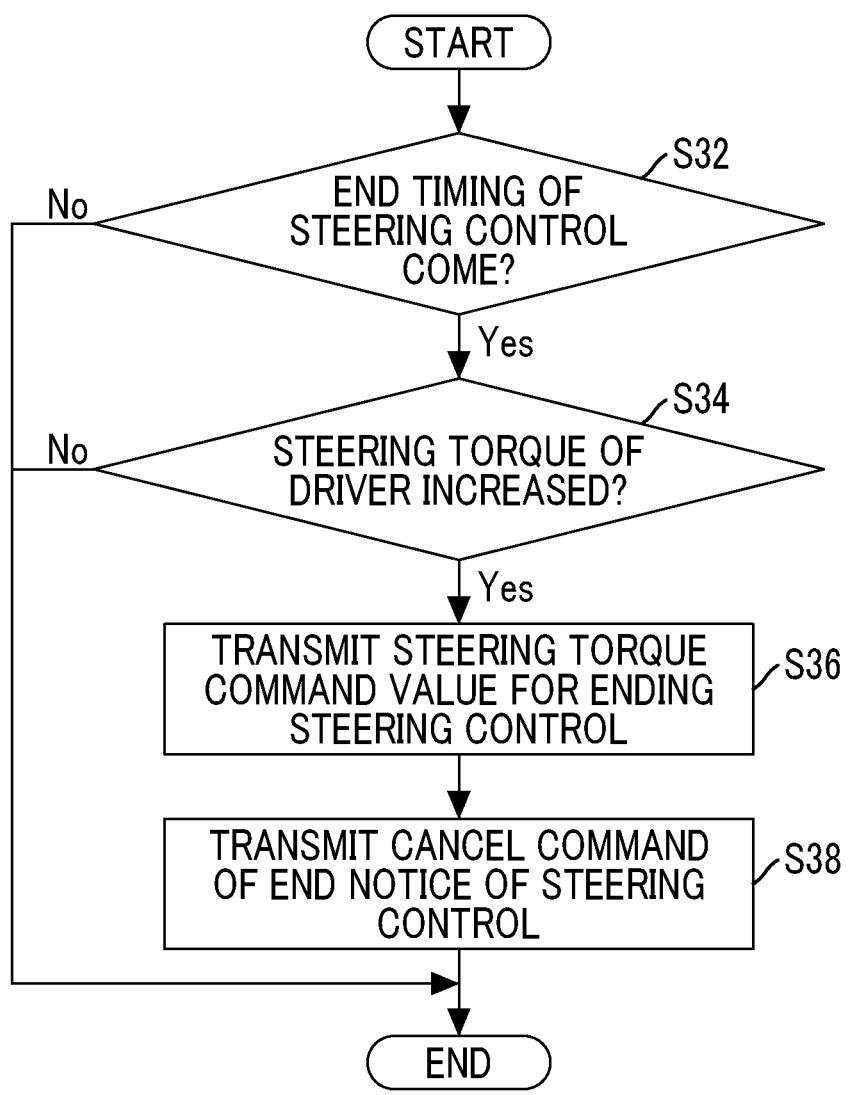
FIG. 8 is a flowchart for describing an example of a steering control end processing routine implemented by the driving assistance ECU in Embodiment 1.

FIG. 6 is a flowchart for describing an example of an assistance control processing routine implemented by the driving assistance ECU 10 in Embodiment 1. FIG. 7 is a flowchart for describing an example of a reduction processing routine implemented by the driving assistance ECU 10 in Embodiment 1. FIG. 8 is a flowchart for describing an example of a steering control end processing routine implemented by the driving assistance ECU 10 in Embodiment 1. The processing routines described above are repeatedly implemented at a predetermined calculation cycle while an ignition switch is on.

When the processing routine illustrated in FIG. 6 is activated, the driving assistance ECU 10 first determines whether the object is recognized (step S10). The recognition processing of the object is as described in the description of the object recognition unit 13. When the driving assistance ECU 10 determines that the object is not recognized, the driving assistance ECU 10 exits the processing routine.

In step S10, when the driving assistance ECU 10 determines that the object is recognized, the driving assistance ECU 10 selects the assistance control (step S12) and sets at least one of the start timing or the end timing of the selected assistance control (step S14). The selection processing of the assistance control and the setting processing such as the start timing of the selected assistance control are as described in the description of the assistance control determination unit 14.

Following step S14, the driving assistance ECU 10 sets at least one of the target steering assist torque or the target deceleration (step S16). A reason for setting at least one of the target steering assist torque or the target deceleration is that at least one of the deceleration control or the steering control is selected in step S14. The setting processing of the target deceleration is as described in the description of the deceleration controller 15. The setting processing of the target steering assist torque is as described in the description of the steering controller 16.

Following step S16, the driving assistance ECU 10 executes at least one of transmitting of the steering torque command value to the steering ECU 30 such that the steering control starts from the start timing set in step S14 or transmitting of the braking command to the brake ECU 20 such that the deceleration control starts from the same start timing (step S18).

Following step S18, the driving assistance ECU 10 sets the start timings of the start notice and the end notice of the assistance control and transmits the start timings to the warning ECU 40 (step S20). The setting processing of the start timings of the start notice and the end notice of the assistance control is as described in the description of the assistance control determination unit 14.

When the processing routine illustrated in FIG. 7 is activated, the driving assistance ECU 10 first determines whether the end timing of the steering control comes (step S22). The determination in step S22 is performed based on whether the end timing of the steering control is set and whether the timing of the determination processing is earlier than the end timing of the steering control. When the end timing of the steering control is not set or the timing of the determination processing elapses the end timing, the driving assistance ECU 10 determines that the end timing does not come. When the driving assistance ECU 10 determines that the end timing of the steering control does not come, the driving assistance ECU 10 exits the processing routine.

In step S22, when the driving assistance ECU 10 determines that the end timing of the steering control comes, the driving assistance ECU 10 performs the determination relating to the deviation possibility after the end timing of the steering control (step S24). The determination processing relating to the deviation possibility is as described in the description of the reduction processing determination unit 17. When the driving assistance ECU 10 determines that there is no deviation possibility, the driving assistance ECU 10 exits the processing routine.

In step S24, when the driving assistance ECU 10 determines that there is the deviation possibility, the driving assistance ECU 10 postpones the end timing of the steering control (step S26). Following step S26, the driving assistance ECU 10 sets at least the target steering assist torque during the postponement of the end timing (step S28). The reason for setting at least the target steering assist torque is that the steering control is performed alone or in combination with the deceleration control. When the steering control is in combination with the deceleration control, the target deceleration is set in addition to the target steering assist torque in step S26. Following step S28, the driving assistance ECU 10 transmits at least the steering torque command value during the postponement of the end timing to the steering ECU 30 (step S30). A series of pieces of processing in steps S26 to S30 is described in the description of the reduction processing determination unit 17 and FIG. 5.

When the processing routine illustrated in FIG. 8 is activated, the driving assistance ECU 10 first determines whether the end timing of the steering control comes (step S32). The determination processing in step S32 is basically the same processing as step S22 of FIG. 7. However, when the driving assistance ECU 10 delays the end timing of the steering control in step S26 of FIG. 7, the determination in step S32 is performed based on whether the timing of determination processing is earlier than the end timing of the steering control after the postponement.

In step S32, when the driving assistance ECU 10 determines that the end timing of the steering control comes, the driving assistance ECU 10 determines whether the steering torque of the driver increases (step S34). When the driving assistance ECU 10 determines that the steering torque (positive steering torque or negative steering torque) of the driver does not increase, determination can be made that the driver needs to continue the steering control, the end notice of the steering control is not yet issued, or the driver is not aware of the end notice of the steering control. Therefore, the driving assistance ECU 10 exits the processing routine. In order to enhance the accuracy of the determination in step S34, the determination relating to the steering torque of the driver may be in combination with determination relating to the line of sight of the driver using an in-vehicle camera.

In step S34, when the driving assistance ECU 10 determines that the steering torque of the driver increases, determination can be made that the driver indicates intention of the steering wheel operation. Therefore, the driving assistance ECU 10 transmits the steering torque command value for ending the steering control to the steering ECU 30 (step S36). The processing in step S36 is as described in the description of the steering controller 16.

Following step S36, the driving assistance ECU 10 transmits a cancel command for canceling the start timing of the end notice of the steering control set in step S20 of FIG. 6 to the warning ECU 40 (step S38). When the cancel command is issued, the end notice of the steering control by the warning ECU 40 is not performed.

Effect of Reduction Processing According to Embodiment 1

Figure 9:
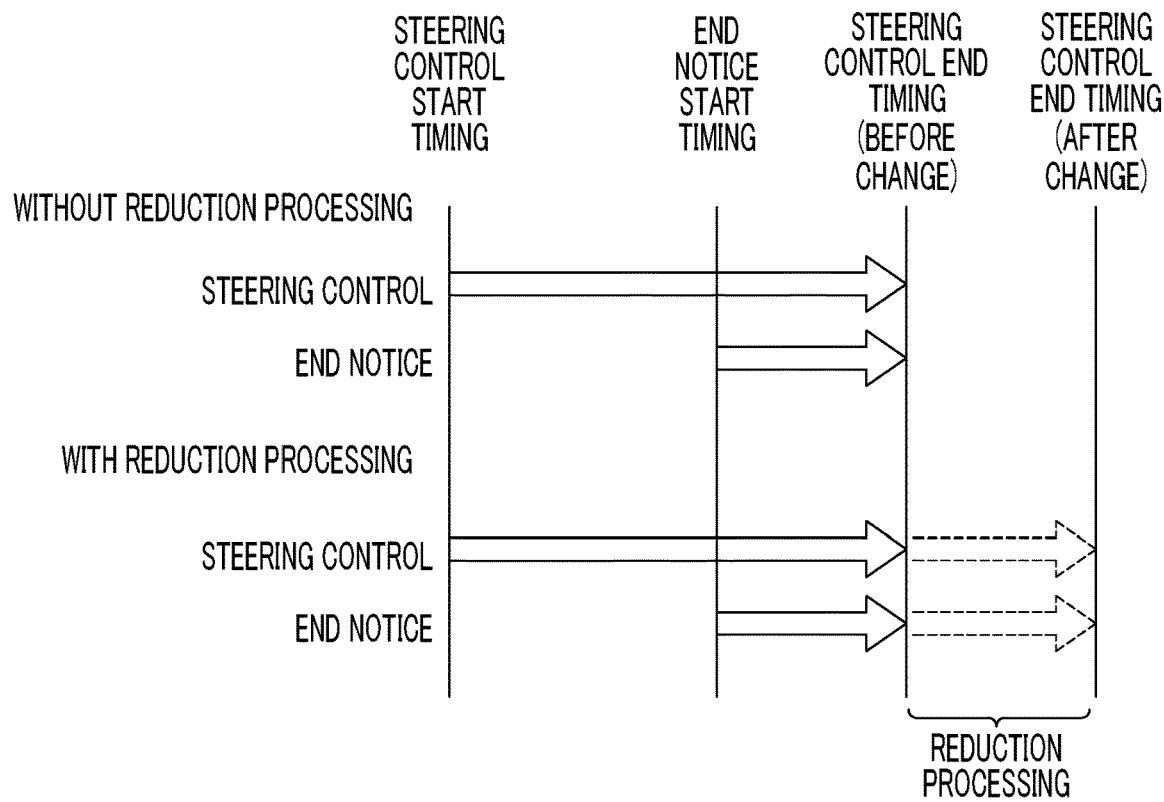
FIG. 9 is a diagram for describing an effect of the reduction processing according to Embodiment 1.

FIG. 9 is a diagram for describing an effect of the reduction processing according to Embodiment 1. The various timings relating to the steering control are drawn in FIG. 9. A difference between the upper row and the lower row of FIG. 9 is presence or absence of the execution of the reduction processing. As being understood by comparing lengths of arrows in the upper row and the lower row of FIG. 9, when the reduction processing is executed, the end timing of the steering control is postponed. Accordingly, the deviation of the host vehicle from the current traveling lane is suppressed. When the reduction processing is executed, the end timing of the end notice of the steering control is also postponed. Accordingly, a period for preparing the driver for the end of the steering control is ensured, and delivery of steering initiative from the control device to the driver is safely performed. Accordingly, the deviation possibility after the end of the steering control is further reduced.

A modification example of Embodiment 1 will be described. The control device according to Embodiment 1 extends the steering control and the execution period of the end notice of the steering control in the reduction processing. However, the execution period of the end notice of the steering control may not be extended. This is because the deviation of the host vehicle from the current traveling lane can be suppressed with a high probability regardless of the extension of the execution period of the end notice of the steering control when the execution period of the steering control is extended. In the reduction processing according to the modification example, when the end timing of the steering control is postponed, the reduction processing determination unit 17 transmits the alert command to the warning ECU 40. The warning ECU 40 starts the operation of the sound output means or the like as the end notice of the steering control from a timing before the end timing after the postponement of the steering control by a predetermined time based on the alert command.

Figure 10:
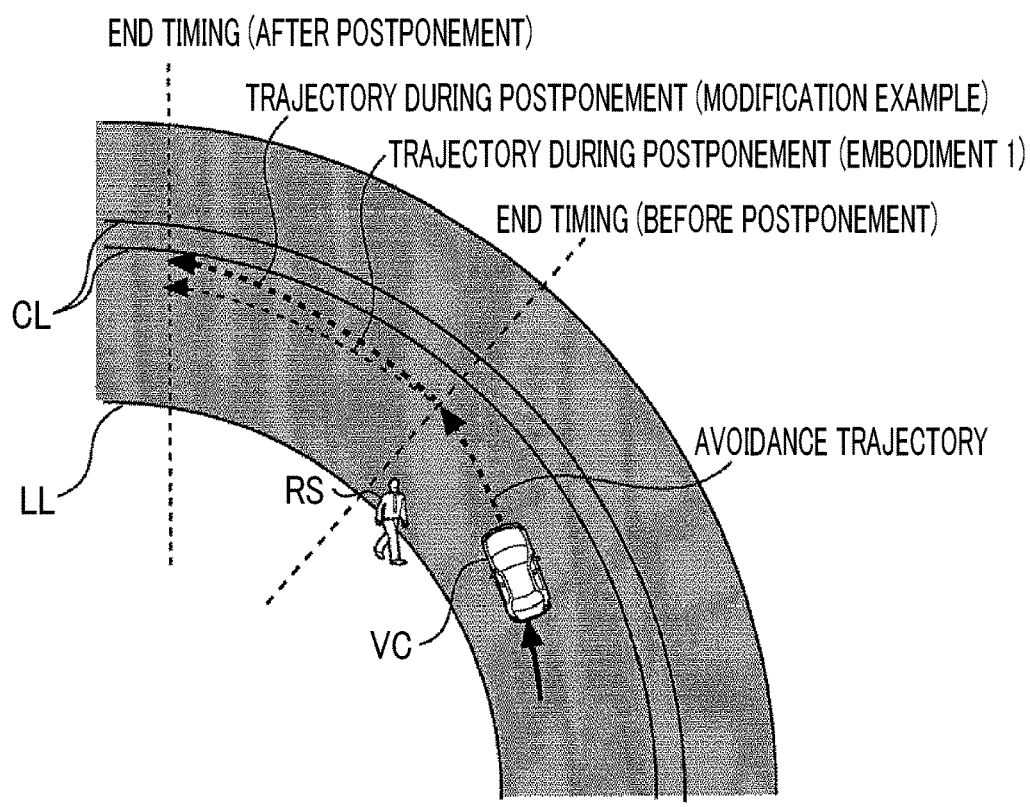
FIG. 10 is a diagram for describing an example of reduction processing according to a modification example of Embodiment 1.

In the reduction processing, the control device according to Embodiment 1 specifies the trajectory for maintaining the distance from the position of the host vehicle VC at the end timing before the postponement of the steering control to the center line CL during the postponement of the end timing as the trajectory during the postponement (refer to FIG. 5). However, the trajectory during the postponement is not limited to the trajectory illustrated in FIG. 5. FIG. 10 is a diagram for describing an example of the reduction processing according to the modification example of Embodiment 1. In the modification example illustrated in FIG. 10, at least the steering control is assumed to be selected as the assistance control similarly to the example illustrated in FIG. 5. The host vehicle VC and the object RS illustrated in FIG. 10 are the same as those illustrated in FIG. 5. The end timing (before postponement) and the end timing (after postponement) illustrated in FIG. 10 are the same as the end timings illustrated in FIG. 5.

As being understood by comparing two trajectories during the postponement illustrated in FIG. 10, the trajectory during the postponement according to the modification example is positioned near the center line CL compared with the trajectory during the postponement according to Embodiment 1. This is because the trajectory during the postponement is set with the position of the host vehicle VC at the end timing after the postponement of the steering control as the reference. Specifically, in the modification example, the distance from the position of the host vehicle VC at the end timing of the steering control to the center line CL is set as a reference distance, and a trajectory connecting the position of the host vehicle VC and a position of the host vehicle VC at the end timing before the postponement within the current traveling lane is set as the trajectory during the postponement. As described above, during the postponement of the end timing, various modifications can be employed in the trajectory during the postponement as long as a trajectory is set to maintain a distance from a boundary line on a deviation side of the current traveling lane to the host vehicle VC to be equal to or larger than a predetermined distance.

The control device according to Embodiment 1 calculates the steering torque (target steering torque, target steering assist torque, and steering torque command value) as a control amount for steering the steering tire-wheel assemblies. However, the control device may calculate a steering angle (target steering angle, target steering assist angle, and steering angle command value) instead of the steering torque. In the case, for example, assuming that a steering angle neutral point is 0°, the steering angle when the steering tire-wheel assemblies are rotated in the right direction from the steering angle neutral point can be represented as a positive value, and the steering angle when the steering tire-wheel assemblies are rotated in the left direction can be represented as a negative value. The modification can be similarly employed in Embodiment 2 described next.

Embodiment 2 will be described with reference to FIGS. 11 and 12. Since a configuration of the control device according to Embodiment 2 is common to the configuration of Embodiment 1, the description of the configuration will be omitted.

Feature of Reduction Processing According to Embodiment 2

The control device according to Embodiment 1 postpones the end timing of the steering control while the device executes the reduction processing that maintains the start timing of the end notice of the steering control at the start timing before the postponement. The control device for the vehicle according to Embodiment 2 does not postpone the end timing of the steering control while the device executes the reduction processing that advances the start timing of the end notice of the steering control earlier than the initially set timing.

In the reduction processing according to Embodiment 2, when the reduction processing determination unit 17 determines that there is the deviation possibility, the reduction processing determination unit 17 advances the timing of the end notice of the steering control. The assistance control determination unit 14 transmits the alert command to the warning ECU 40 at the stage before the steering tire-wheel assemblies are autonomously steered. The warning ECU 40 starts or ends the operation of the sound output means or the like based on the alert command. As described above, the end notice of the steering control is executed during the period from the timing earlier than the initially set timing to the end timing of the assistance control.

Figure 11:
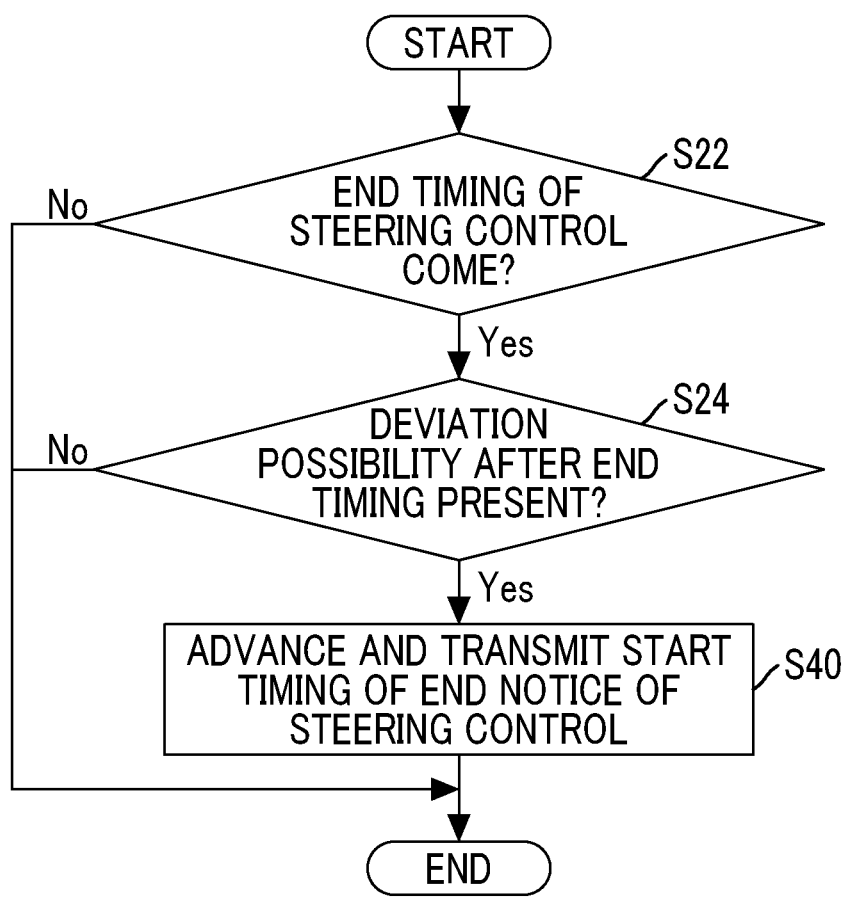
FIG. 11 is a flowchart for describing an example of a reduction processing routine implemented by a driving assistance ECU in Embodiment 2.

FIG. 11 is a flowchart for describing an example of the reduction processing routine implemented by the driving assistance ECU 10 in Embodiment 2. When the processing routine of FIG. 7 is replaced with the processing routine illustrated in FIG. 11, the assistance control processing routine according to embodiment 2 is described.

The processing routine illustrated in FIG. 11 differs from the processing routine illustrated in FIG. 7 only in processing when a determination result in step S24 is positive. That is, in step S24, when the reduction processing determination unit 17 determines that there is the deviation possibility, the driving assistance ECU 10 advances the start timing of the end notice of the steering control and transmits the advanced start timing to the warning ECU 40 (step S40).

Figure 12:
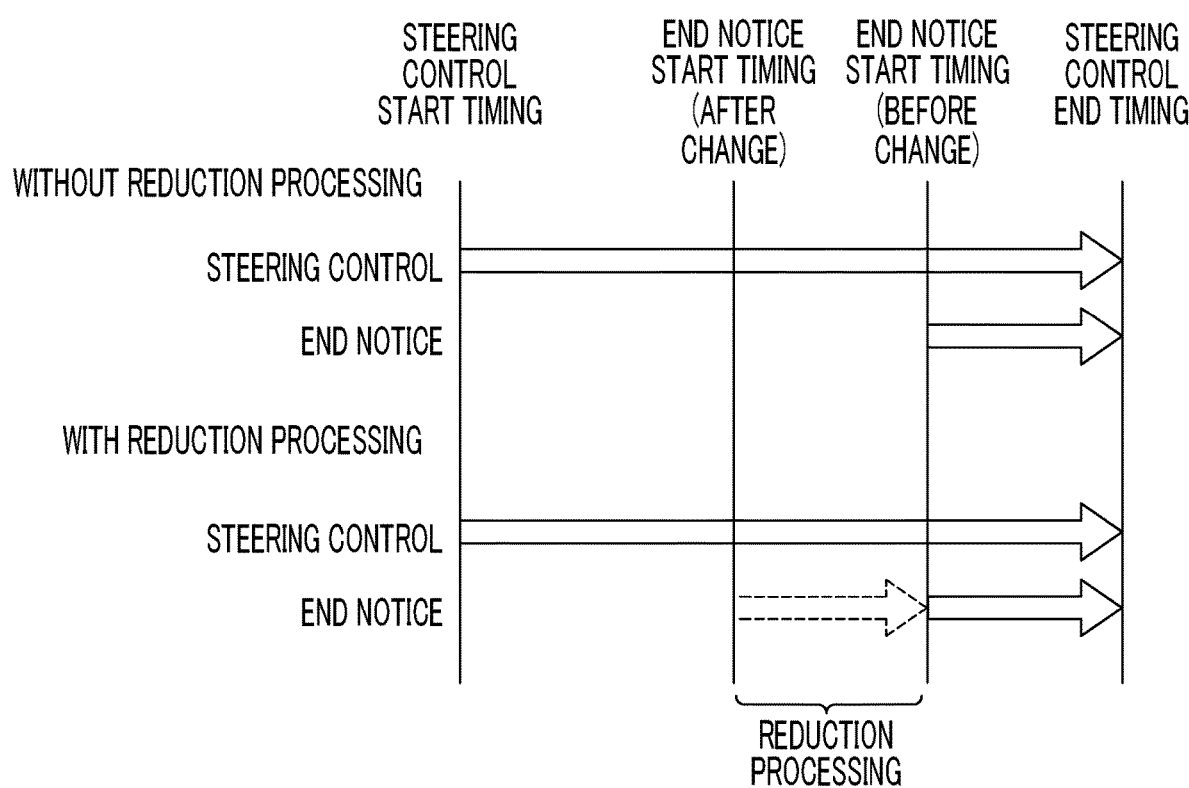
FIG. 12 is a diagram for describing an effect by reduction processing according to Embodiment 2.

FIG. 12 is a diagram for describing an effect by the reduction processing according to Embodiment 2. The various timings relating to the steering control are drawn in FIG. 12. A difference between the upper row and the lower row of FIG. 12 is the presence or absence of the execution of the reduction processing. As being understood by comparing lengths of arrows in the upper row and the lower row of FIG. 12, when the reduction processing is executed, the start timing of the steering control is advanced. Accordingly, a period for preparing the driver for the end of the steering control is ensured, and the delivery of steering initiative from the control device to the driver is safely performed. Accordingly, the deviation possibility after the end of the steering control is further reduced.

What is claimed is:

1. A control device for a vehicle, the control device comprising:
    an external sensor that detects an object outside the vehicle; and
    a driving assistance electronic control unit programmed to:
        determine whether or not the vehicle has a possibility of colliding with the object;
        based upon the determination that the vehicle has the possibility of colliding with the object, select a driving assistance control for avoiding collision of the vehicle with the object, wherein the driving assistance control includes at least one of a deceleration control or a steering control;
        set a time period for executing the driving assistance control;
        execute the driving assistance control;
        during execution of the driving assistance control and before the vehicle passes the object, determine whether or not a deviation possibility is present of the vehicle deviating from a current traveling lane at a point when the vehicle is predicted to pass the object; and extend the time period for executing the driving assistance control when the electronic control unit determines that the deviation possibility is present.

2. The control device according to claim 1, wherein, when the time period for executing the driving assistance control is extended, the electronic control unit causes the vehicle to travel along a trajectory that maintains a distance, from a boundary line on a deviation side of the current traveling lane to the vehicle, to be equal to or larger than a predetermined distance.

3. The control device according to claim 2, wherein:
the electronic control unit is further programmed to control an interface of the vehicle to notify a driver of the vehicle, at a predetermined time before the extended time period ends, that the driving assistance control will end.

4. A control method of a vehicle including an electronic control unit, the method comprising:
detecting, by an external sensor, an object outside the vehicle;
determining, by the electronic control unit, whether or not the vehicle has a possibility of colliding with the object;
selecting, by the electronic control unit, a driving assistance control for avoiding collision of the vehicle with the object, wherein the driving assistance control includes at least one of a deceleration control or a steering control;
setting, by the electronic control unit, a time period for executing the driving assistance control;
executing, by the electronic control unit, the driving assistance control;
during execution of the driving assistance control and before the vehicle passes the object, determining, by the electronic control unit, whether or not a deviation possibility is present of the vehicle deviating from a current traveling lane at a point when the vehicle is predicted to pass the object; and
extending, by the electronic control unit, the time period for executing the driving assistance control when the electronic control unit determines that the deviation possibility is present.

5. The control method according to claim 4, wherein, based upon the time period for executing the driving assistance control being extended, causing the vehicle to travel along a trajectory that maintains a distance, from a boundary line on a deviation side of the current traveling lane to the vehicle, to be equal to or larger than a predetermined distance.

6. The control method according to claim 5, further comprising controlling an interface of the vehicle to notify a driver of the vehicle, at a predetermined time before the extended time period ends, that the driving assistance control will end.

* * * * *